United States Patent
Phely et al.

(10) Patent No.: US 8,695,721 B2
(45) Date of Patent: Apr. 15, 2014

(54) AGRICULTURAL MACHINE WITH ASSOCIATED WHEEL AND ROLLER ENABLING FURROW CREATION

(75) Inventors: Olivier Phely, Thenisy (FR); Denis Piou, Villeblevin (FR)

(73) Assignee: Otico, Chalmaison (FR)

( * ) Notice: Subject to any disclaimer, the term of this patent is extended or adjusted under 35 U.S.C. 154(b) by 0 days.

(21) Appl. No.: 13/561,663

(22) Filed: Jul. 30, 2012

(65) Prior Publication Data

US 2013/0037284 A1 Feb. 14, 2013

(30) Foreign Application Priority Data

Aug. 12, 2011 (FR) ...................................... 11 02513

(51) Int. Cl.
- *A01B 5/00* (2006.01)
- *A01B 7/00* (2006.01)
- *A01B 15/16* (2006.01)
- *A01B 21/00* (2006.01)
- *A01B 23/06* (2006.01)
- *A01B 35/28* (2006.01)
- *A01B 39/08* (2006.01)
- *A01B 21/02* (2006.01)

(52) U.S. Cl.
USPC ..................................... 172/537; 152/209.12

(58) Field of Classification Search
USPC .......... 152/209.12, 209.13, 209.22, 902, 526, 152/540, 552; D12/579, 570, 544; 57/258; 172/537; 492/15
See application file for complete search history.

(56) References Cited

U.S. PATENT DOCUMENTS

| | | | | |
|---|---|---|---|---|
| 2,587,463 | A * | 2/1952 | Guignard | 404/125 |
| D258,657 | S * | 3/1981 | Stark | D15/27 |
| 4,446,902 | A * | 5/1984 | Madec et al. | 152/209.12 |
| 5,010,935 | A * | 4/1991 | Bonko et al. | 152/209.12 |
| 5,843,248 | A * | 12/1998 | Baus et al. | 152/209.1 |
| 7,124,835 | B2 * | 10/2006 | Piou | 172/539 |
| 2005/0087351 | A1 * | 4/2005 | Piou | 172/578 |
| 2012/0077656 | A1 * | 3/2012 | Piou et al. | 492/15 |

FOREIGN PATENT DOCUMENTS

| | | | | | |
|---|---|---|---|---|---|
| DE | 4018366 | A1 * | 12/1991 | | A01B 29/04 |
| EP | 0878328 | A1 * | 11/1998 | | A01B 29/04 |
| EP | 1380198 | A1 * | 1/2004 | | A01B 29/04 |
| EP | 1856962 | A1 * | 5/2007 | | A01B 29/04 |
| EP | 1856963 | A1 * | 11/2007 | | A01B 29/04 |
| WO | WO 03103369 | A1 * | 12/2003 | | A01B 49/00 |
| WO | WO 2007123479 | A1 * | 11/2007 | | A01B 29/04 |

\* cited by examiner

*Primary Examiner* — Árpád Fábián-Kovács
(74) *Attorney, Agent, or Firm* — Oblon, Spivak, McClelland, Maier & Neustadt, L.L.P.

(57) ABSTRACT

An agricultural machine having a first frame and a roller with a tube mounted about a first axis. A second frame is connected to the first frame and a wheel, which includes a rim mounted about a second axis. The wheel has a tire and the roller has a covering around the tube. The covering and the tire tread have moldings defining a pattern element repeated in a transverse direction parallel to the first axis and to the second axis, respectively. The pitch of transverse repeat of the pattern element of the roller and the pitch of transverse repeat of the pattern element of the wheel are equal to the nearest 10%. The pattern elements define ribs the height of which on the roller and the height of which on the wheel are equal to the nearest 90%.

12 Claims, 10 Drawing Sheets

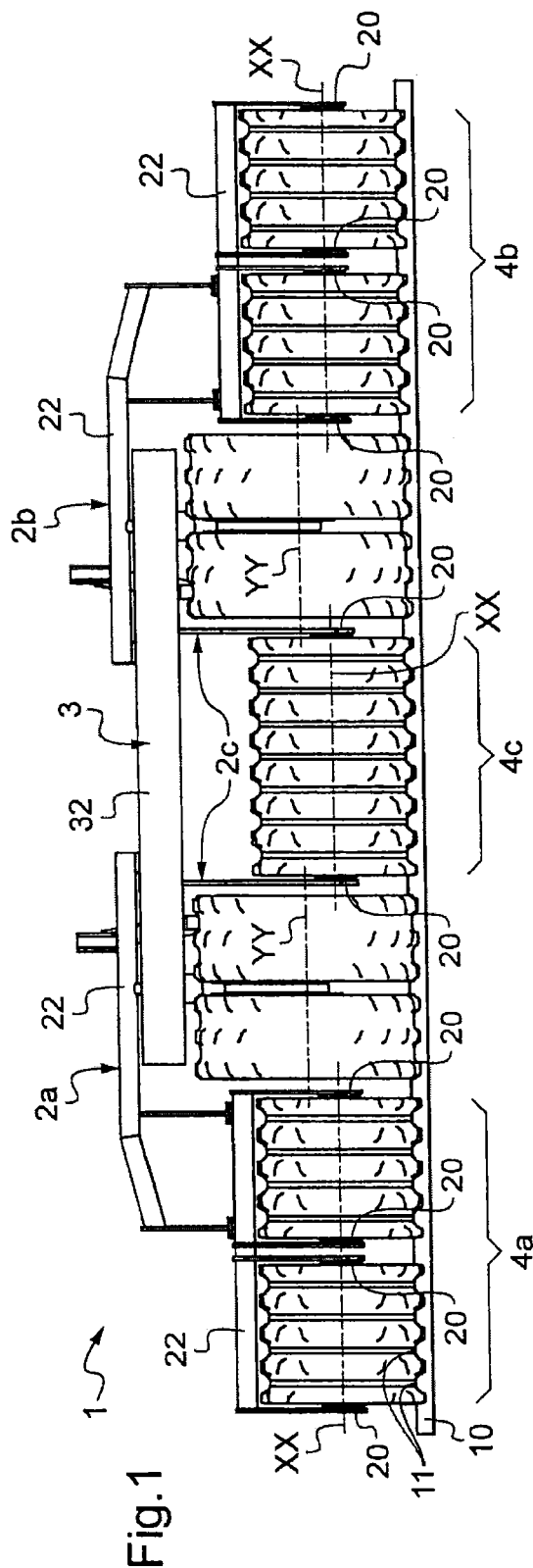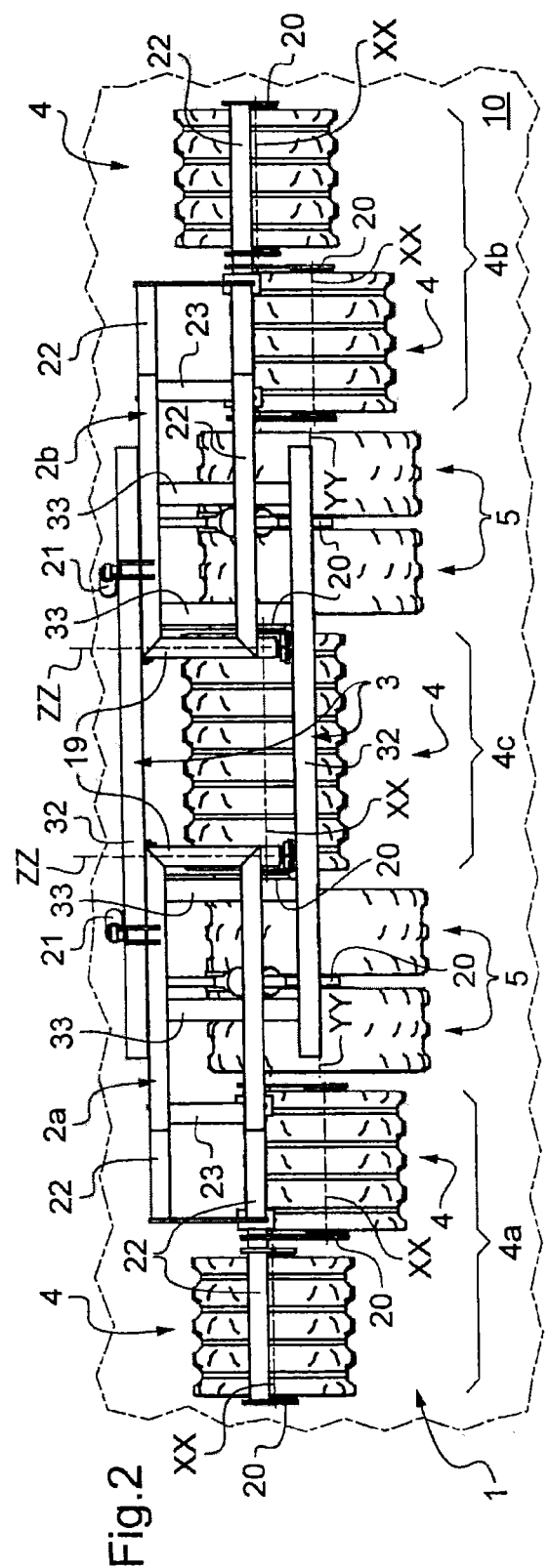

Figure 3:
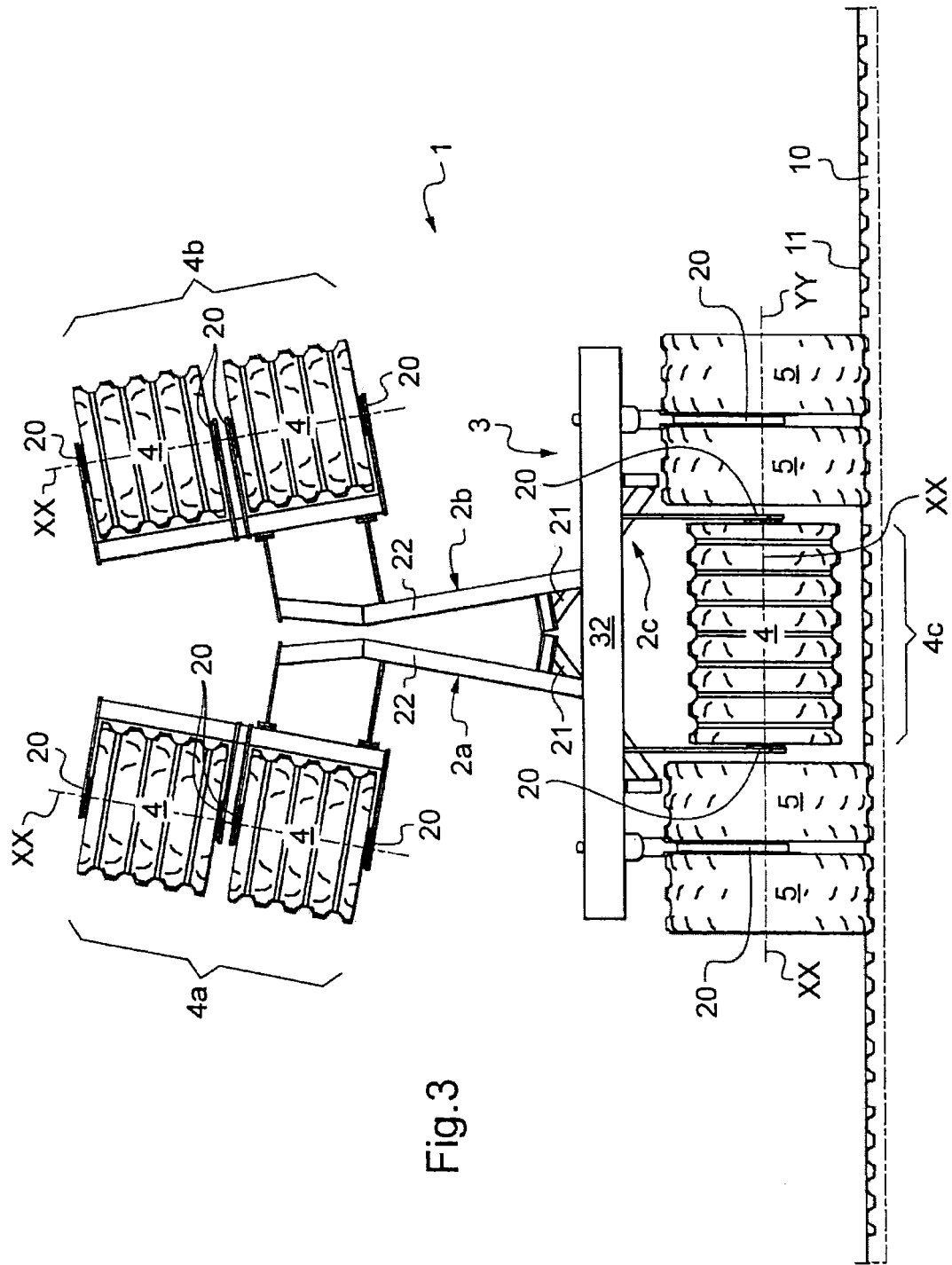

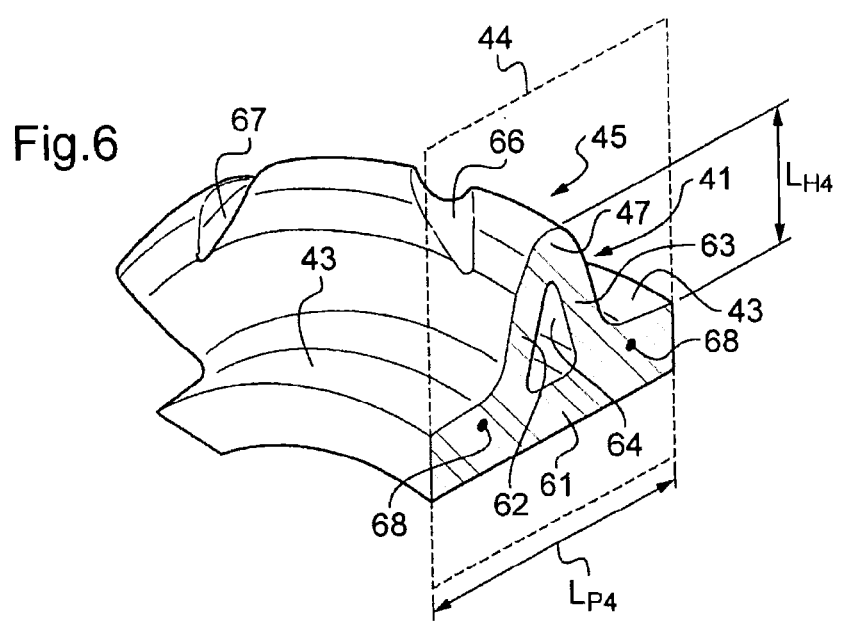
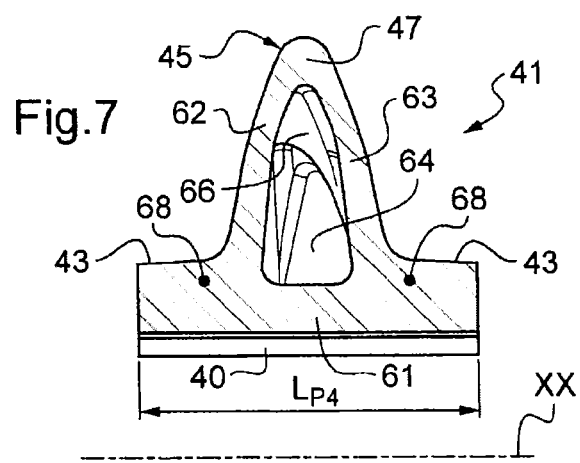
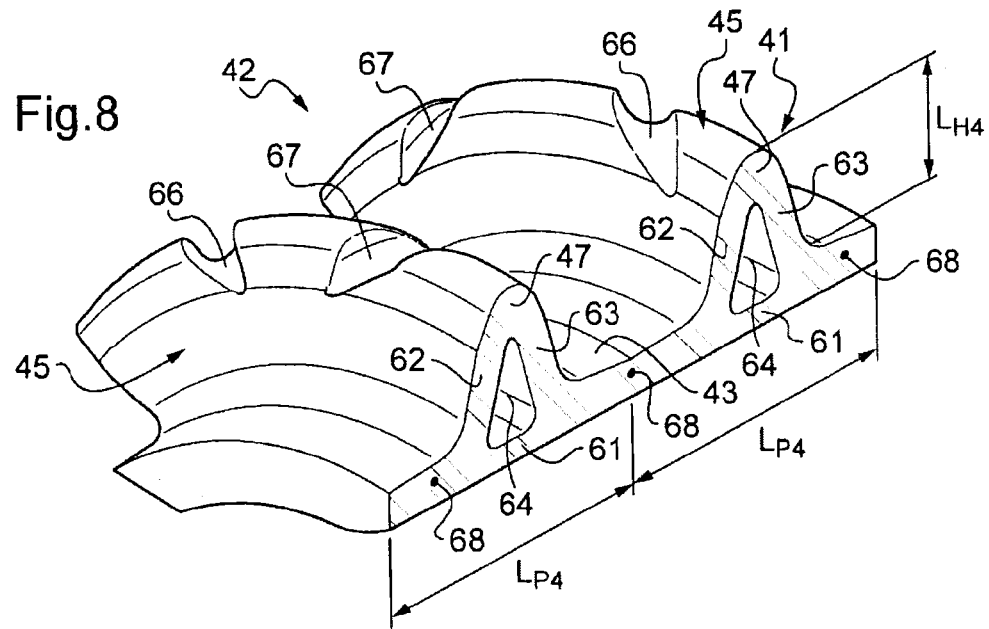

AGRICULTURAL MACHINE WITH ASSOCIATED WHEEL AND ROLLER ENABLING FURROW CREATION

The invention relates to an agricultural machine comprising one or more rollers and wheels which enable furrows to be created in the earth for re-firming the earth, sowing seeds or pricking out plants.

A roller of this kind is disclosed for example in the document FR 2763279 in the name of the present applicant. This roller is designed solely for working in fields. While the machine is travelling on the roads, the roller has to be supported so that its tyres do not roll on the road, which would cause rapid wear. To this end, the machine comprising the roller is equipped with support wheels which are retractable between a working position, in which the roller rests freely on the ground, and a road position, in which the roller is supported above ground level.

In this type of apparatus, the support wheels in the working position, i.e. retracted, do not perform any function of ground preparation. Consequently, the total dimension of the roller, or the set of rollers, covers the entire working width in the working position. The combination of support wheels as well as rollers over the entire working width makes an agricultural machine of this kind complex. The machine has a high mass, resulting in a substantial energy consumption.

In other apparatus, the support wheels are not retracted in the working position. The wheels then produce undesirable tracks in the ground, which impairs the homogeneity of the furrows over the working width.

The applicant has also proposed a semi-supported agricultural machine in which the roller fitted with its tyres can successively work in the field to create furrows in the ground and then travel on the road without any need to raise the roller. An apparatus of this kind is described in the document FR 2841733. This apparatus saves on the retractable support wheels or similar system as well as the control means for these support wheels. This system is satisfactory.

Nevertheless, the applicant has continued to research in order to improve the apparatus still further. In the road transport position, the self supported position of the roller, i.e. where the roller is in contact with the road, limits the speed of travel. Additional mechanical elements enable certain parts of the roller to be mutually independent. This limits the considerable and heterogeneous wear, particularly on uneven roadways. However, the additional mechanical elements are expensive and increase the total mass of the machine. Maintaining such apparatus is expensive. The specificity of the parts used makes repairs and replacements complex.

The invention sets out to improve the situation.

The invention sets out essentially to propose an agricultural machine comprising a first frame and at least one roller, the roller comprising at least one tube mounted for rotation about a first axis on bearings connected to the first frame. The agricultural machine comprises a second frame connected to the first frame and at least one wheel, the wheel comprising at least one rim mounted for rotation about a second axis on bearings connected to the second frame. The wheel is provided with at least one tyre threaded onto the rim. The roller has a covering around the tube, the tyre of the wheel having a tread, the covering and the tread being provided with mouldings defining a pattern element repeated in a transverse direction parallel to the first axis, and to the second axis, respectively. The transverse repeat pitch of the pattern element of the roller and the transverse repeat pitch of the pattern element of the wheel are equal, to the nearest 10%. The pattern elements define ribs, the height of which on the roller and the height of which on the wheel are equal, to the nearest 90%. The repetition and the height of the ribs make it possible to form a series of substantially parallel and substantially equidistant furrows in the earth.

Preferably, the roller is provided with a series of pneumatic tyres threaded onto the tube. The pneumatic tyres include the covering. The pneumatic tyres of the roller are of the semi-hollow type in which part of the covering is connected to a sleeve by two sidewalls so as to define a hollow annular space. The hollow annular space of a pneumatic tyre advantageously occupies a volume that is less than the volume occupied by the material that makes up said pneumatic tyre.

In an advantageous embodiment, the ribs of at least one of the tyre or roller have profiles with a rounded dome, viewed in cross section. The end of the ribs may comprise a flattened area.

Notably in a working position, and according to one embodiment, the first and second axes are substantially parallel and are spaced at a chosen distance. This distance is preferably chosen to be greater than the height of the ribs of the roller or wheel and less than the larger of the radii of the roller and the wheel. This distance may be, in particular, less than the smaller of the radii of the roller and the wheel.

In order to improve the handling of an agricultural machine of this kind, notably in the transporting position, it may further comprise at least one braking means adapted to exert a resistant torque, in controlled manner, between the first frame and the tube and/or between the second frame and the rim.

The agricultural machine may comprise two wheels or two pairs of wheels, a central roller and two lateral rollers. Each wheel or pair of wheels is disposed between the central roller and each of the two lateral rollers, respectively, in a direction parallel to the first axis, in a working position. Preferably, each of the two lateral rollers is retractable into a transporting position. In a transporting position the agricultural machine advantageously has a maximum dimension, in a direction parallel to the first axis of the central roller, which is less than or equal to three meters.

Figure 4:
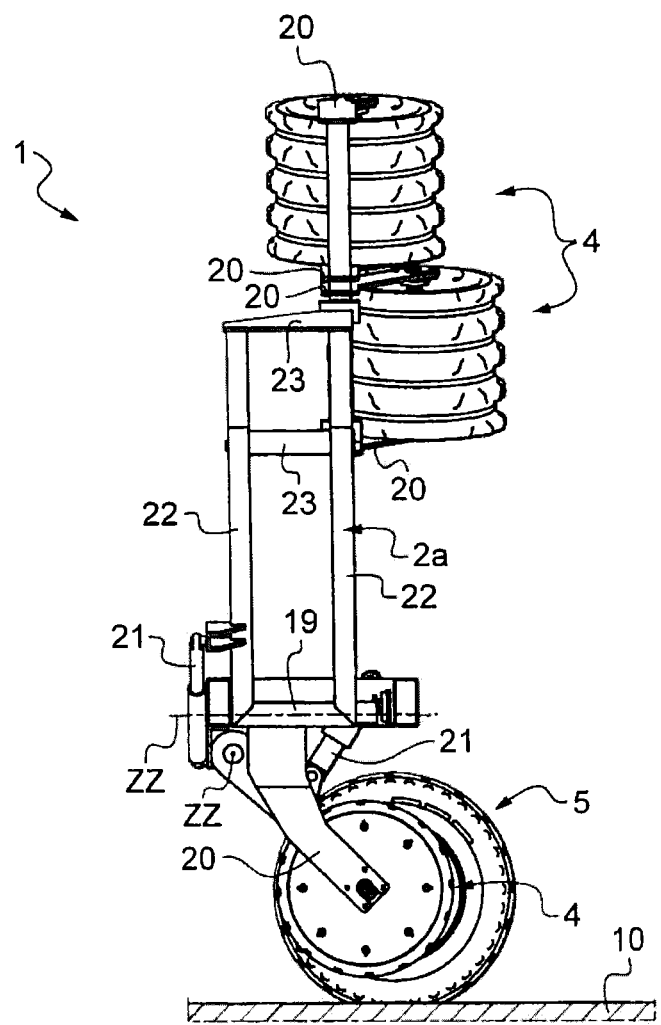
Figure 5:
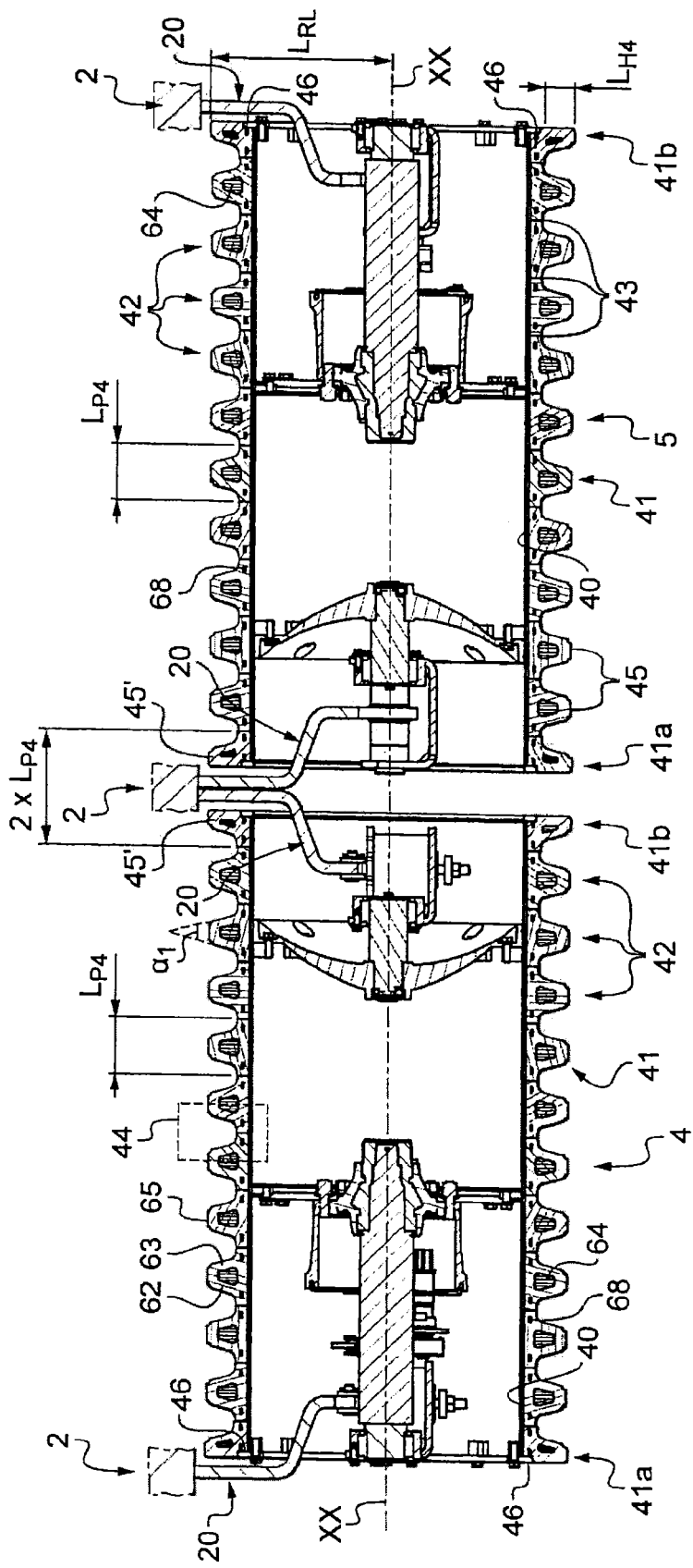
Figures 9, 10:
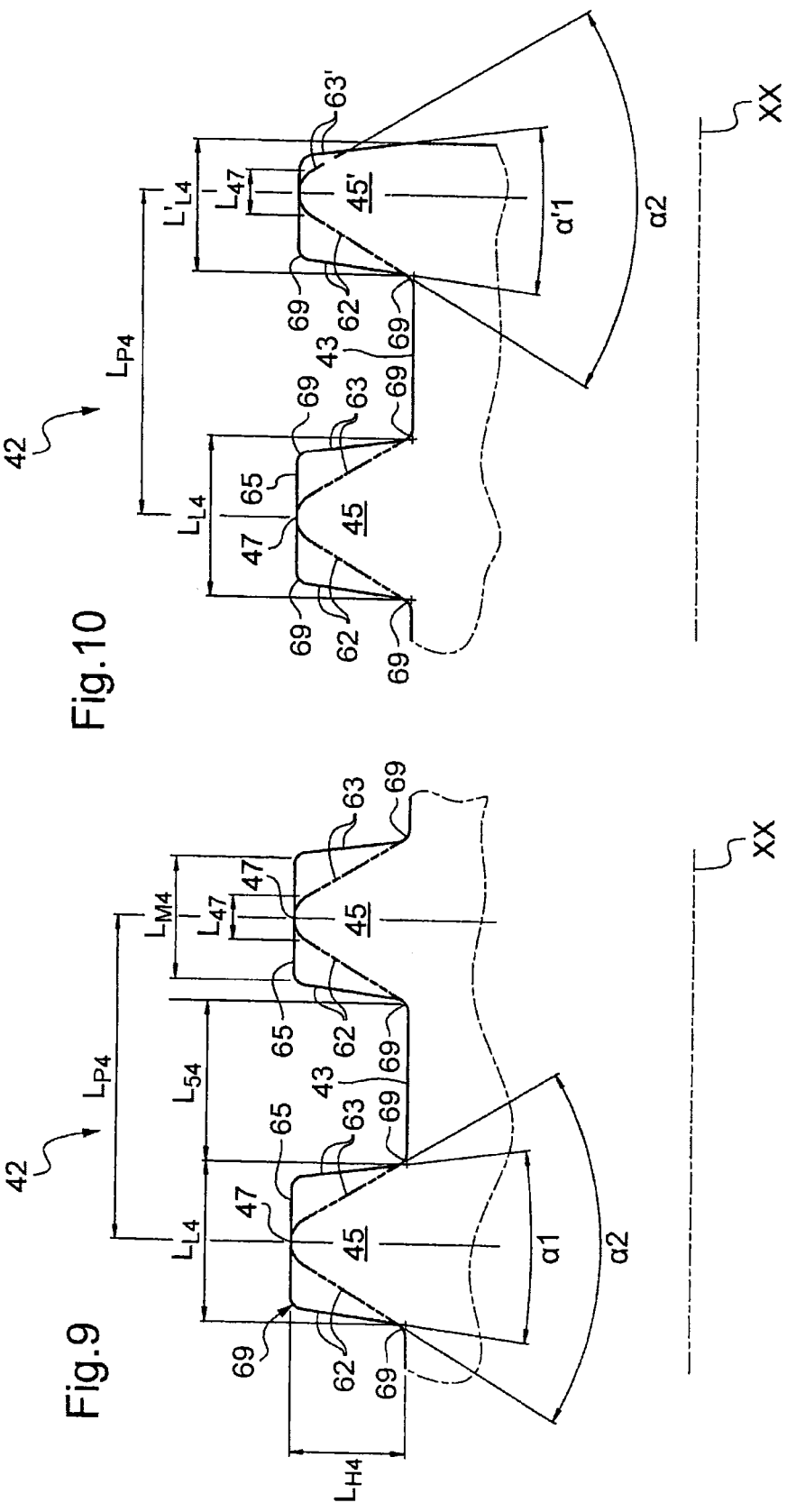
Figure 11:
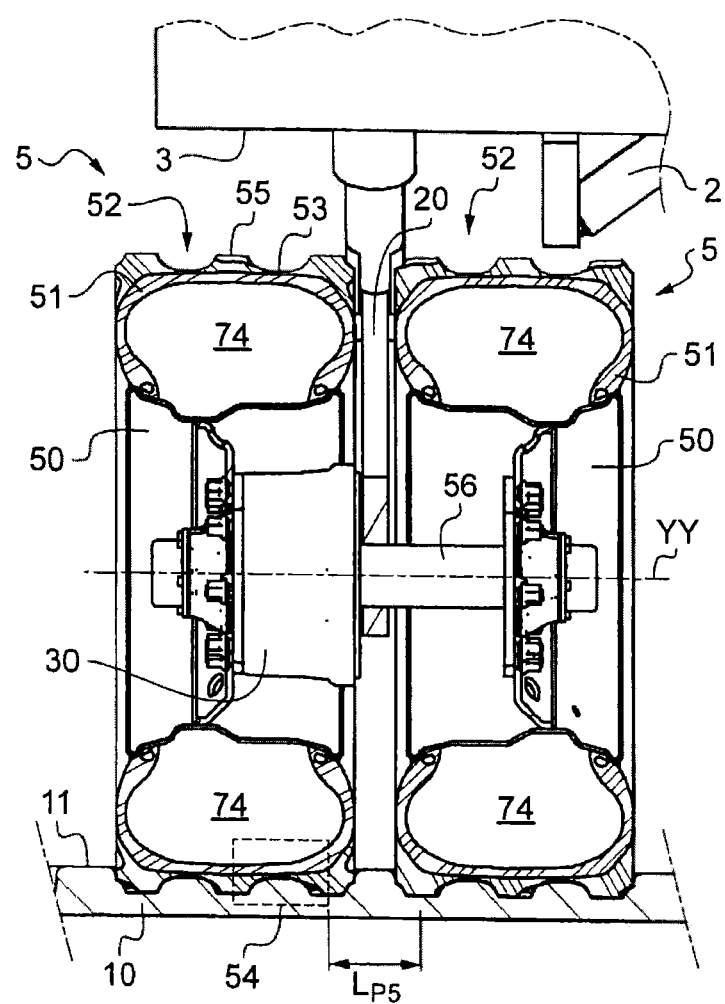
Figure 13:
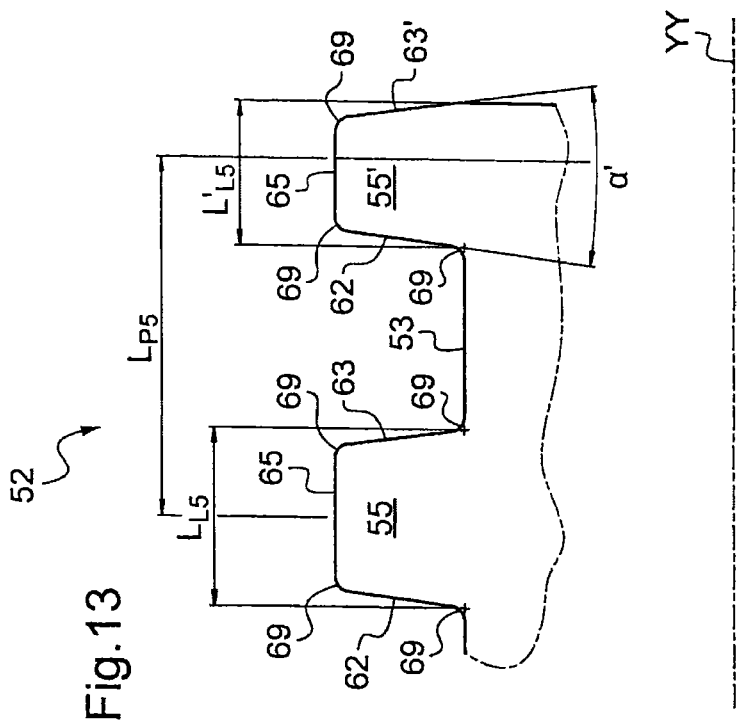
Figure 12:
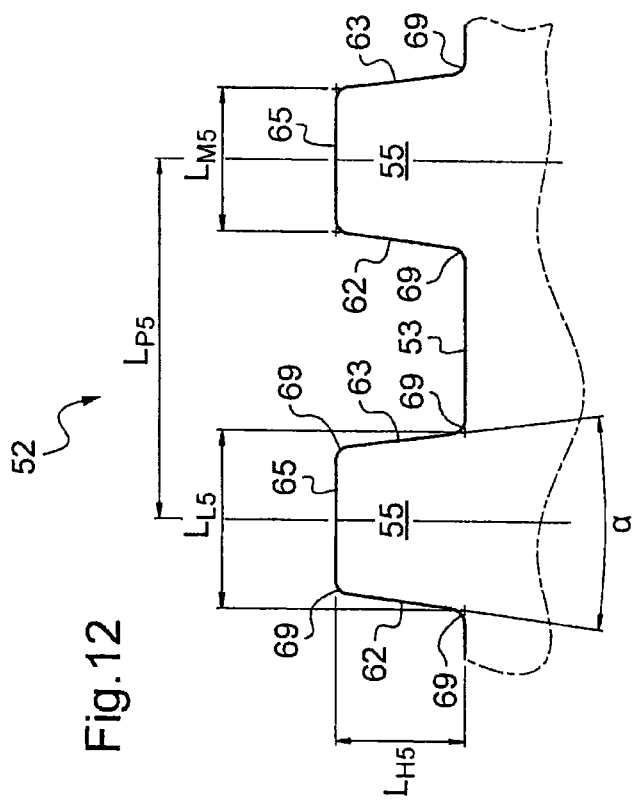
Figure 14:
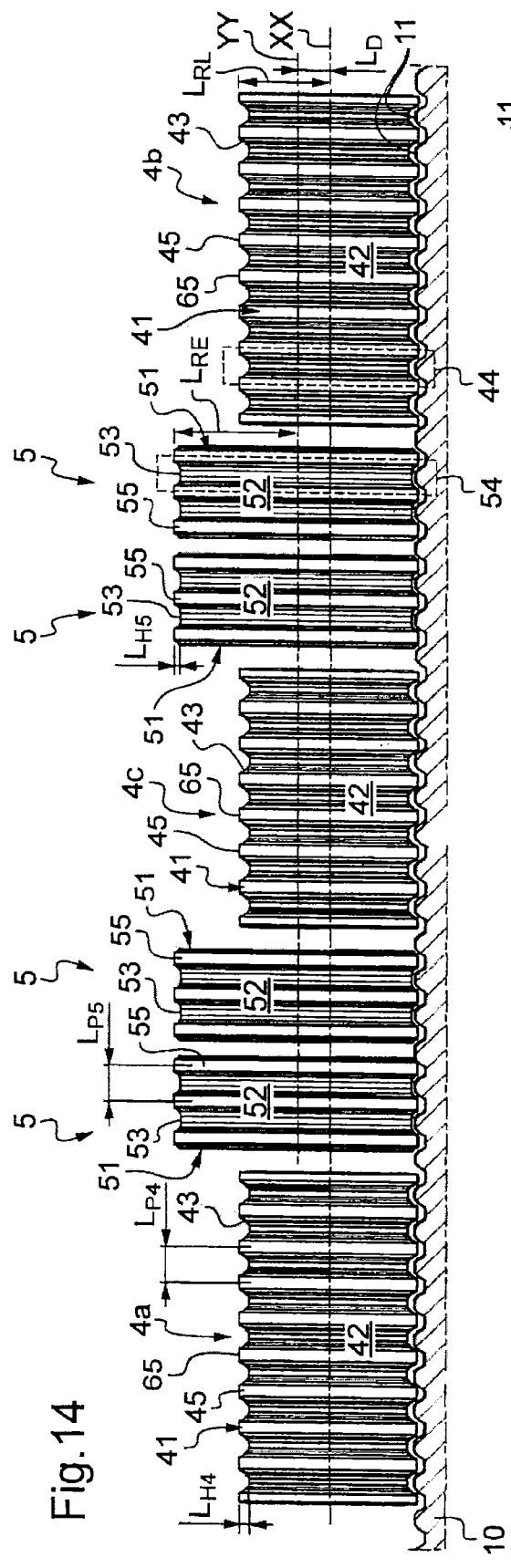
Figure 15:
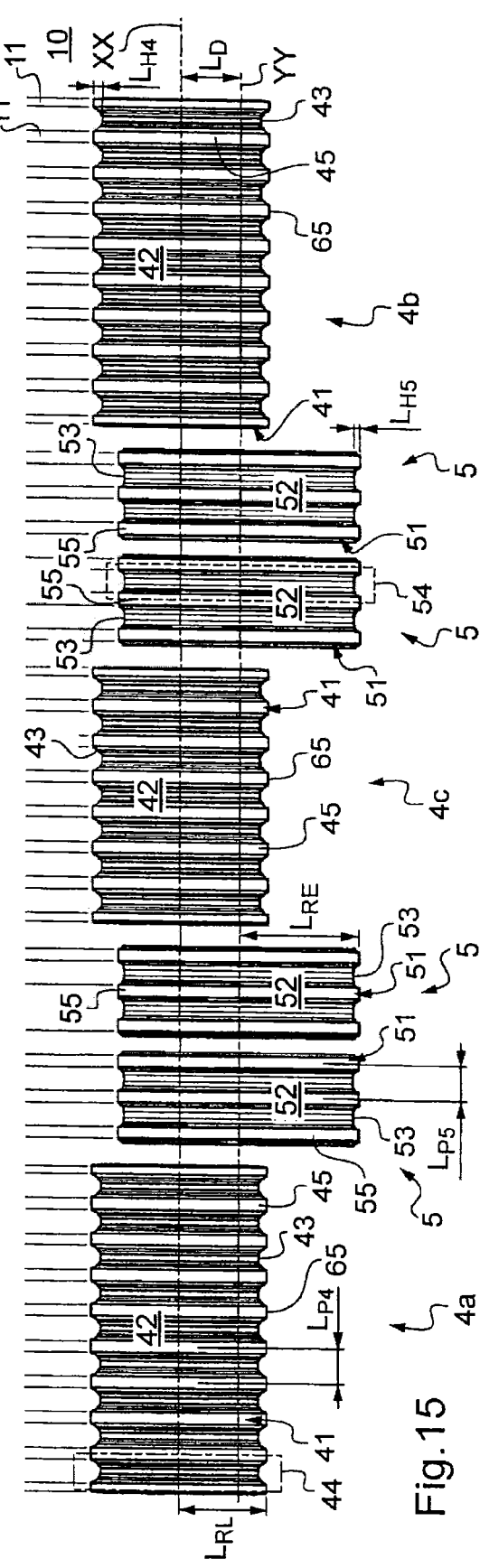
Figure 16:
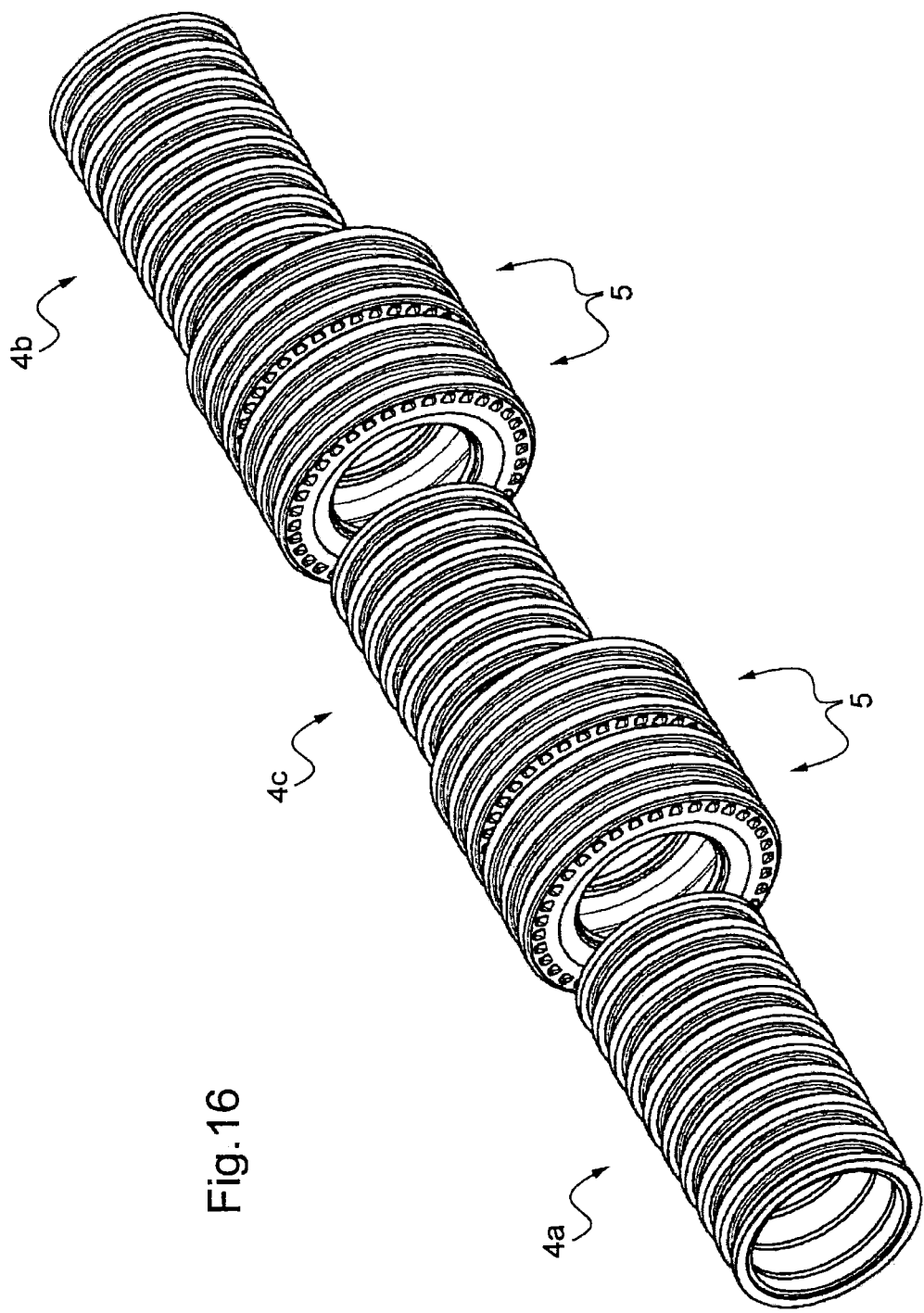

Further features and advantages of the invention will become apparent from a study of the detailed description that follows, and the accompanying drawings, wherein:

FIG. 1 is a general schematic view from the rear of an agricultural machine in the working position, FIG. 2 is a top view of the agricultural machine in FIG. 1, FIG. 3 is a schematic view of the rear of an agricultural machine in the transporting position, FIG. 4 is a side view of the agricultural machine in FIG. 3, FIG. 5 is a sectional view of a pair of rollers of an agricultural machine, FIG. 6 is a partial schematic view, in section and in perspective, of part of a roller tyre, FIG. 7 is a partial schematic view, in longitudinal section, of a roller of an agricultural machine, FIG. 8 is a partial schematic view, in perspective and in section, of a part of a roller tyre, FIG. 9 is a partial schematic view, in section, of part of the covering of a roller of an agricultural machine, FIG. 10 is a partial schematic view, in section, of an end portion of a covering of a roller of an agricultural machine, FIG. 11 is a sectional view of a pair of wheels of an agricultural machine, FIG. 12 is a schematic view, in section, of part of the tread of a wheel of an agricultural machine, FIG. 13 is a partial schematic view, in section, of an end portion of a tread of a wheel of an agricultural machine, FIG. 14 is a schematic view, from behind, of the wheels and rollers of an agricultural machine, showing only the pneumatic tyres and tyres, FIG. 15 is a top view of the wheels and rollers in FIG. 14, and FIG. 16 is a perspective view of the wheels and rollers in FIGS. 14 and 15.

The attached drawings are essentially of a specific kind and may serve not only to complete the invention but may help to define it in some cases. It is pointed out that elements such as the geometry of the profiles of tyres and pneumatic tyres are difficult to define completely other than by means of drawings.

Reference is made to FIGS. 1 and 2 which show an agricultural machine 1 pulled by a vehicle (not shown) such as a tractor. In the example described here the agricultural machine 1 is in the working position. The terms front and rear are used in accordance with the direction of advance of the agricultural machine 1. The front part of the agricultural machine 1 is at the top in FIG. 2. The agricultural machine 1 comprises two first lateral frames 2a, 2b and a first central frame 2c each connected to the same second frame 3.

Each first lateral frame 2a, 2b comprises, in the example described here, longitudinal elements 22 arranged substantially perpendicularly to the direction of advance of the agricultural machine 1. Each first lateral frame 2a, 2b comprises spacers 23. The spacers 23 are arranged substantially parallel to the direction of advance of the agricultural machine 1 and connect the longitudinal elements 22 to one another. The longitudinal elements 22 support bearings 20. The first central frame 2c comprises two arms connected to the second frame 3. Each arm supports a bearing 20. The bearings 20 support tubes 40 of rollers 4 mounted for rotation about first axes XX. In the example described here, each of the first lateral frames 2a, 2b comprises two pairs of bearings 20. The first central frame 2c comprises a pair of bearings 20. Each pair of bearings 20 supports a tube 40 mounted for rotation about the first axis XX.

The second frame 3 comprises longitudinal elements 32 arranged substantially perpendicularly to the direction of advance of the agricultural machine 1. The second frame 3 comprises spacers 33 arranged substantially parallel to the direction of advance of the agricultural machine 1 and joining together the longitudinal elements 32. Each first frame 2a, 2b, 2c is connected to the second frame 3 by a rotation shaft 19 along a rotation axis ZZ. The rotation axes ZZ of the first lateral frames 2a, 2b are substantially parallel to the spacers 33. The rotation axis ZZ of the first central frame 2c is substantially perpendicular to the spacers 33 (not visible in FIGS. 1 and 2). The second frame 3 supports other bearings 20. In the example described here the bearings 20 of the second frame 3 support rims 50 mounted to be rotatable about second axes YY. Here, each of the two bearings 20 of the second frame 3 supports a wheel axle 56 (not visible in FIGS. 1 and 2) which in turn supports two rims 50. The pair of rims 50 on the left in FIGS. 1 and 2 is mounted for rotation about the same second axis YY. The pair of rims 50 on the right in FIGS. 1 and 2 is mounted for rotation about the same second axis YY. As a variant, the agricultural machine 1 comprises a single rim 50 on the left and a single rim 50 on the right.

Each tube 40 belongs to a roller 4. Each rim 50 belongs to a wheel 5. The rollers 4 are mounted for rotation about first axes XX. The wheels 5 are mounted for rotation about second axes YY.

In the example described here, the agricultural machine 1 comprises two pairs of wheels 5, a pair of left-hand lateral rollers 4a, a pair of right-hand lateral rollers 4b, and a central roller 4c. The pairs of wheels 5 are supported by the second frame 3 on bearings 20. The pair of left-hand lateral rollers 4a is supported by the first left-hand lateral frame 2a by means of bearings 20. The pair of right-hand lateral rollers 4b is supported by the first right-hand lateral frame 2b by means of bearings 20. The central roller 4c is supported by the first central frame 2c on bearings 20 and located between each of the pairs of wheels 5.

Jacks 21 enable each first frame 2a, 2b, 2c to be set in rotation relative to its rotation axis ZZ in order to move from a working position as shown in FIGS. 1 and 2 to a transporting position as shown in FIGS. 3 and 4. In the working position, the rollers 4 and the wheels 5 rest on the ground 10 to form furrows 11. In the transporting position, the first lateral frames 2a, 2b are raised above the second frame 3. The central roller 4 is raised at a distance above the ground 10 by means of another jack 21, which is not visible in FIGS. 1 to 3. The wheels 5 are in contact with the ground 10, while the rollers 4 are raised. In the transporting position, the wheels 5 support most of the weight of the agricultural machine 1.

Reference will now be made to FIG. 5. Each roller 4 comprises at least one tube 40 mounted for rotation about a first axis XX via bearings 20 connected to the first frame 2. The roller 4 has a covering 42 around the tube 40.

In the embodiment described here, the covering 42 is formed by a succession of pneumatic tyres 41a, 41, 41b mounted around the tube 40. The tyres 41a, 41, 41b are threaded on adjacent to one another and are held at each end of the stack, for example by means of an end cheek 46 fixedly attached to the tube 40 which clamps and holds the succession of tyres 41a, 41, 41b.

It is possible to assemble the tyres 41 by their respective sidewalls 62, 63 forming parts that are in contact. Thrust means at the end may be used to produce the assembly. The various tyres 41a, 41, 41b of the stack may furthermore be attached to one another by suitable assembly elements (not shown), for example those described in the publication FR-A-2784331, in the name of the present Applicant, to which reference may be made for more details. Each end cheek 46 bears against the first tyre 41a, or last tyre 41b, respectively, of the stack, which, because of their functions, may have a slightly different profile from the tyres 41 in the centre of the roller 4, to enable them to fit into each of the cheeks 46. The cheek 46 is in turn attached to the central tube 40. In this way the stack of tyres 41a, 41, 41b and the tube 40 form a fixed assembly constituting a roller 4 adapted to be mounted by means of the bearings 20 on the first support frame 2 of the agricultural machine 1.

One embodiment of a pneumatic tyre 41 is shown in FIGS. 6 and 7. This type of tyre 41 is slightly different from those in FIG. 5. An assembly of tyres 41 of this kind, of the semi-hollow type, is described in French patent application no. FR 2913915.

In the embodiment shown in FIGS. 6 and 7, the tyre 41 of the roller 4 has a semi-hollow domed profile. The semi-hollow profile comprises two sidewalls 62, 63 connected to a sleeve 61. The sleeve 61 is arranged substantially parallel to the wall of the tube 40. The sidewalls 62 and 63 of the semi-hollow profile extend in the opposite direction from the tube 40. The sidewalls 62, 63 are mutually connected by their ends opposite to the tube 40. The connected ends of the sidewalls 62, 63 form the dome 47. The outer casing of the dome 47 forms part of the covering 42. The outer casing of the sidewalls 62, 63 and of the dome 47 form, in a plane comprising the first axis XX, a circumferential rib 45 of the roller 4 which is interposed between two half-mouldings 43. The term rib here denotes the male portion of the tyre profile 41, whereas the moulding here refers to the female part of the tyre profile 41.

In the example described here, the sleeve 61 and the sidewalls 62, 63 define a hollow annular space 64. This configuration gives the tyre 41 a semi-hollow character, i.e. the hollow annular space 64 is not inflated but is able to communicate with the ambient medium through an orifice (not shown) passing through the thickness of the sleeve 61. This orifice, in addition to allowing equilibration of the pressures during use, makes it possible to inject pressurised air during the vulcanisation step of the manufacturing process.

In fact it is desirable that the tyre 41 should be capable of deforming to some extent in the region contained between the dome 47 and the sleeve 61 to allow detachment of the soil which would otherwise tend to stick to the tyre 41 in the region of the sidewalls 62, 63. This deformation of the tyre 41, which gives it a flexibility sufficient to absorb the deformation and be self-cleaning, is nevertheless limited by the dome shape, which prevents the dome 47 being subjected to excessive wear.

The hollow annular space 64 of a tyre 41 preferably occupies a volume less than that taken up by the material that constitutes the tyre 41.

According to a variant, the tyres 41 are solid, i.e. the hollow annular space 64 does not exist.

In the embodiment described here, the sleeve 61 is mechanically strengthened by two metal retaining rings 68 embedded in the material of the tyre 41, in particular for ensuring a better grip on the tube 40 in spite of the mechanical stresses to which the tyre 41 is subjected, which may be fairly intense and forceful. Alternatively, the tyre 41 may have only one, more than two or even no metallic retaining ring.

In the embodiment described here, the tyres 41 comprise, at the top of the covering 42, i.e. within the dome 47, indentations 66, 67 formed on the periphery of the tyre 41 and distributed in the circumferential direction. In the embodiment in FIGS. 6 and 7, these indentations 66, 67 are arranged obliquely, i.e. they form an angle of the order of 30° to 45° alternately in one side and then the other. The indentations 66, 67 are designed so as each to extend in a half-space defined by a median plane of the tyre 41 on alternate sides of this plane, the indentations 66, 67 also being circumferentially offset from one indentation 66 to the next 67.

Alternatively, instead of the indentations 66, 67, the periphery of the tyre 41 may have staples. The staples project from the outer casing of the tyre 41 opposite the indentations 66, 67. In another variant the tyres 41 comprise a combination of indentations 66, 67 and staples. The indentations 66, 67 and/or staples form chosen irregularities in the outer surface of the tyre 41 and hence in the covering 42. In another variant, shown in FIGS. 14 to 16, the tyres 41 do not comprise either indentations or projections.

FIG. 8 shows an embodiment in which a tyre 41 is similar to two tyres 41 in FIG. 6, juxtaposed and made in one piece. The tyre 41 in FIG. 8 comprises two ribs 45 separated by a moulding 43, the whole being interposed between two other half-mouldings 43.

The outer surface of the juxtaposition of the tyres 41a, 41, 41b forms the covering 42 of the roller 4, cf. FIG. 5. In other words, in a direction parallel to the first axis XX, the covering 42 comprises an alternating succession of mouldings 43 and ribs 45. A rib 45 bordered by two half-mouldings 43, or a moulding 43 bordered by two half-ribs 45, or a rib 45 juxtaposed with a moulding 43, defines a pattern element 44. The pattern element 44 is repeated in the direction of the first axis XX.

The transverse repeat pitch of the pattern element 44 of the roller 4 is designated $L_{P4}$. The term transverse is used here to denote the left-right direction of the agricultural machine 1, as opposed to a circumferential direction on the roller 4. In the embodiments of FIGS. 5 to 7, the width of each tyre 41 in the direction of the first axis XX, is equal to the pitch $L_{P4}$. In the embodiment in FIG. 8, the width of the tyre 41 in a direction parallel to the first axis XX is equal to twice the pitch $L_{P4}$ of a roller 4 formed by tyres 41 of this kind. In other words, the tyre 41 in FIG. 8 by itself comprises a recurrence of two pattern elements 4.

The projection in a plane perpendicular to the first axis XX of the distance separating the outer casing of a moulding 43 and the outer casing of the dome 47 of the adjacent rib 45 defines a height $L_{H4}$ of the rib 45. The height $L_{H4}$ may also be seen as being the depth of the moulding 43. In other words, the covering 42 of the roller 4 is defined, inter alia, by the pattern element 44 and its repeat pitch $L_{P4}$ corresponding to the "peak to peak" or "valley to valley" distance according to the direction of the first axis XX. The covering 42 of the roller 4 is also defined by the height $L_{H4}$ of the ribs 45, i.e. the variations in diameter of the outer surface of the roller 4 according to the direction of the first axis XX.

In use, the movement of the first support frame 2 according to the advance of the agricultural machine 1 causes the roller 4 to rotate by the reaction of the tyres 41a, 41, 41b on the ground 10. The tyres 41a, 41, 41b create furrows 11 in the ground 10 which are substantially parallel to one another and equidistant, in which seeds may be sown, for example. The spacing between the centres of the furrows 11 corresponds to the pitch between the domes 47 of the adjacent ribs 45, in other words belonging to two adjacent pattern elements 44. This spacing corresponds to the pitch $L_{P4}$ of the roller 4. The choice of value for the pitch $L_{P4}$ depends on the desired distance between the furrows 11. The spacing between the furrows 11 can be adjusted by interposing, between adjacent tyres 41, intercalary annular elements, the width of which in the axial direction will be selected as a function of the desired spacing of the furrows 11. The width of the furrows 11 produced by the tyres 41 may be selected as a function of the possible applications, in order for example to form a single row of sowings or at least two rows of sowings.

The depth of the furrows 11 corresponds substantially to the height $L_{H4}$ of the ribs 45. The choice of value for the height $L_{H4}$ of the ribs 45 depends on the desired depth of the furrows 11.

The presence or absence and choice of indentations 66, 67 and/or projections depends notably on the type of irregularity desired for the furrows 11. The indentations 66, 67 and/or the projections also make it possible to improve the friction between the roller 4 and the ground 10 to prevent slipping.

In the embodiments shown in FIGS. 6 to 8, the ribs 45 of a roller 4 have a profile in the shape of a rounded dome. Alternatively, as shown in FIGS. 5 and 14 to 16, the dome 47 may have a flattened area 65. The flattened area 65, viewed in profile, forms the end of the rib 45 and belongs to the covering 42.

Reference will now be made to FIG. 9 showing the geometry of the covering 42 of a roller 4 in section in a plane comprising the first axis XX. FIG. 9 shows a central portion of the covering 42 in the axial direction XX of the roller 4, formed for example by the tyres 41 of FIGS. 6 and 7. Two embodiments are shown in FIG. 9: a first embodiment with a so-called trapezoidal profile for the rib 45 comprising a flattened area 65, and a second embodiment, shown in dashed lines in the drawing, with a so-called triangular profile of the rib 45 comprising an end with a rounded dome 47. Each rib 45 has a plane of symmetry perpendicular to the first axis XX and passing through the centre of said rib 45.

The profile of the ribs 45 is partly defined by the shape of the sidewalls 62, 63. Each of the sidewalls 62, 63 has a substantially straight profile in this case. The sidewalls 62, 63 of the same rib 45 form between them an angle designated $\alpha_1$ for the trapezoidal profile and an angle $\alpha_2$ for the triangular profile. The sidewalls 62, 63 are connected to one another by the flattened area 65, substantially parallel to the first axis XX, in the trapezoidal embodiment. The sidewalls 62, 63 are interconnected by the dome 47 in the triangular mode.

The moulding 43 is arranged between two similar ribs 45 in the direction of the first axis XX. In the example described here and in the plane of section in FIG. 9, the moulding 43 is formed by a substantially straight outer surface parallel to the first axis XX. The sidewalls 62, 63 and the mouldings 43, on the one hand, and the sidewalls 62, 63 and the flattened areas 65, on the other hand, are interconnected via fillets 69. The fillets 69 are not taken into account when measuring angles and distances. In the triangular embodiment, the rounded dome 47 interconnects the sidewalls 62, 63 of a rib 45.

The angle (not marked) between the moulding 43 and the adjacent sidewall 62, 63 is substantially equal to half the angle $\alpha_1, \alpha_2$ between the two sidewalls 62, 63 of a rib 45, plus 90°. The smaller distance, in the direction of the first axis XX, separating two juxtaposed ribs 45 corresponds to the width of the intermediate moulding 43. The width of the moulding 43 is designated $L_{S4}$. Similarly, the distance, in the direction of the first axis XX, separating two juxtaposed mouldings 43, corresponds to the width of the intermediate rib 45. The width of the rib 45 is designated $L_{L4}$. The pitch $L_{P4}$ of the roller 4 corresponds to the sum of the width $L_{L4}$ of a rib 45 and the width $L_{S4}$ of a moulding 43. In the trapezoidal variant, the width of the flattened area 65, in the direction of the first axis XX, is designated $L_{M4}$. The width $L_{M4}$ of the flattened areas 65 is less than or equal to the width $L_{L4}$ of the rib 45. In the triangular variant, the width of the dome 47 in the direction of the first axis XX is designated $L_{47}$. The width $L_{47}$ of the dome 47 is plainly less than the width $L_{L4}$ of the rib 45.

The applicant has determined that by respecting dimensional ratios in the manufacture of the covering 42, and hence in the pattern element 44, it was possible to ensure the creation of furrows 11 which conformed to the great majority of the agronomic parameters desired by users of the agricultural machine 1 while at the same time ensuring satisfactory mechanical behaviour and durability of the covering 42 of the rollers 4. The height $L_{H4}$ of the ribs 45 is between 10% and 70% of the pitch $L_{P4}$ of the roller 4 and preferably between 15% and 65% of the pitch $L_{P4}$ of the roller 4. The width $L_{L4}$ of the ribs 45 is between 15% and 40% of the pitch $L_{P4}$ of the roller 4 and preferably between 20% and 35% of the pitch $L_{P4}$ the roller 4. In the trapezoidal variant, the angle $\alpha_1$ between the two sidewalls 62, 63 of a rib 45 is greater than or equal to 0 and preferably between 2° and 90°. The width $L_{M4}$ of the flattened area 65 is less than or equal to the width $L_{L4}$ of the rib 45. In a triangular mode, the angle $\alpha_2$ between the two sidewalls 62, 63 of a rib 45 is greater than or equal to 0 and preferably between 45° and 90°. The width $L_{47}$ of the dome 47 is greater than 4% of the pitch $L_{P4}$ and preferably greater than 6% of the pitch $L_{P4}$. The angle $\alpha_1, \alpha_2$ between the sidewalls 62, 63 is between 0 and 90°.

FIG. 10 shows an end portion (on the right in FIG. 10) in the direction of the first axis XX of the roller 4, formed for example by a pneumatic tyre 41b from the previous figures. FIG. 10 is similar to FIG. 9 except that the end half of the end rib 45' is truncated (on the right in FIG. 10). The end rib 45' has an asymmetric profile. In other words, the widths $L'_{L4}$, $L'_{M4}$ and the right hand portion of the angle $\alpha'_1$ are reduced compared with their equivalents on the central ribs 45. The sidewall 63' of the triangular version is truncated in its part closest to the tube 40 in order to be connected to an end surface of the roller 4 substantially perpendicular to the first axis XX.

As can be seen better in FIG. 5, a spacing is provided between two rollers 4 so as to allow mechanical connection of the bearings 20 to the frame 2. The truncated appearance of the end ribs 45' makes it possible, in spite of the discontinuity of the coverings 42 of the two juxtaposed rollers 4, to preserve the continuity of the pitch $L_{P4}$ between the two rollers 4. The spacing between the ribs 45 of each of the rollers 4 is then preferably equal to a whole number of the pitch $L_{P4}$. The structure of the furrows 11 formed at the interface of the two rollers 4 is then not very different from that of the other furrows 11.

Reference will now be made to FIG. 11. Each wheel 5 comprises at least one rim 50 mounted for rotation about a second axis YY on bearings 20 connected to the second frame 3. The wheel 5 has a tread 52 around the rim 50. In the embodiment described here, a tyre 51 is mounted around the rim 50 to form the tread 52.

Conventionally, the term "tread" denotes a pneumatic tyre mounted on a wheel and refers to the part of the tyre which is intended to make contact with the ground. Here, the term "covering" defines the covering of the roller, which may comprise a plurality of tyre treads produced individually or a one-piece assembly of tyre treads. In each case, it refers to the outer peripheral surface of the wheel, or the roller, intended to make contact with the road and/or the ground.

The tyre 51 is mounted on the rim 50 in conventional manner. In the embodiment described here, the rims 50 are similar to those of tractors or trucks. The tyres 51 are similar to those of tractor or truck wheels with the exception of the diametrically outer wall. The diametrically outer wall forms the tread 52. The free space designated 74 between the rim 50 and an inner wall of the tyre 51 forms a chamber 74. The chamber 74 is hermetically isolated from the outside. In normal use, in the working position and in the transporting position, the tyre 51 is inflated. In other words, an air pressure greater than atmospheric pressure is maintained in the chamber 74. The inflated wheels 5 are well suited to travelling on roads at substantially higher speeds than the speeds used for working in the field. The inflated wheels 5 are well suited to agricultural vehicles such as the agricultural machine 1.

Reference will now be made to FIG. 12. The tyre 51 of the wheel 5 has a trapezium-shaped profile. Each trapezoidal profile comprises two sidewalls 62, 63 connected at their ends by a flattened area 65. The flattened area 65 is arranged substantially parallel to the second axis YY on which the wheel 5 is mounted for rotation. The sidewalls 62, 63 of the trapezoidal profile extend in a direction opposite from the rim 50. The volume partly delimited by the sidewalls 62, 63 and the flattened area 65 forms a circumferential rib 55 on the wheel 5. Two ribs 55 juxtaposed in the direction of the second axis YY are connected to one another via a moulding 53. The mouldings 53 and the flattened areas 65 are substantially parallel to one another. The rib 55 and the mouldings 53 each form part of the tread 52 of the wheel 5. The term rib here denotes the male portion of the profile of the tread 52 of the tyre 51, whereas the term moulding here denotes the female part of the profile of the tread 52 of the tyre 51. The circumferential rib 55 of the wheel 5 is intercalated between two half-mouldings 53 in a plane containing the second axis YY.

In the example described here, and unlike the examples of semi-hollow profiles for the roller 4, the ribs 55 are solid. This configuration gives the ribs 55 of the tyre 51 good mechanical characteristics when subjected to compression. This is particularly important in the transporting position of the agricultural machine 1 as the majority of the weight of the agricultural machine 1 is supported by the ribs 55 in contact with the road.

In the working position, for example in a field, it is desirable that the tyre 51 should deform to some extent to assist with detachment of the earth which would otherwise tend to stick to the tyre 51 in the region of the sidewalls 62, 63 and/or the mouldings 53. This deformation of the tyre 51 is made possible by the inflated configuration and the presence of the chamber 74. This configuration gives it sufficient flexibility to absorb the deformations and to be self-cleaning.

In the embodiment described here, the tyres 51 comprise, at the peaks of the tread 52, i.e. within the ribs 55, indentations formed on the periphery of the tyre 51 and distributed in the circumferential direction (not shown in FIGS. 12 and 13). The presence or absence of indentations and/or staples and their characteristics are defined in the same way as the indentations and staples described previously with regard to the tyres 41 of the rollers 4. These selected circumferential irregularities on the tread 52 of the wheels 5, in addition to performing similar functions to those of the rollers 4, provide an anti-slipping function for the wheels 5 in the ground 10. In the transporting position, especially on wet roads, the presence of indentations and/or staples in the tread 52 can improve the grip of the tyre 51.

The outer surface of the tyre 51 forms the tread 52 of the wheel 5. In other words, in the direction of the section axis YY, the tread 52 comprises an alternating succession of mouldings 53 and ribs 55. A rib 55 bordered by two half-mouldings 53, or a moulding 53 bordered by two half-ribs 55 or, again, a rib 55 juxtaposed with a moulding 53 defines a pattern element 54. The pattern element 54 is repeated in the direction of the second axis YY. The transverse repeat pitch of the pattern element 54 of the wheel 5 is designated $L_{P5}$. The term transverse is used here to denote the left-right direction of the agricultural machine 1, as opposed to a circumferential direction on the wheel 5.

The projection in a plane perpendicular to the second axis YY of the distance separating the outer surface of a moulding 53 and the outer surface of the flattened area 65 of the adjacent rib 55 defines a height $L_{H5}$ of the rib 55. The height $L_{H5}$ may also be seen as the depth of the moulding 53. In other words, the tread 52 of the wheel 5 is defined, inter alia, by the pattern element 54 and its repeat pitch $L_{P5}$ corresponding to the "peak to peak" or "valley to valley" distance in the direction of the second axis YY. The tread 52 of the wheel 5 is also defined by the height $L_{H5}$ of the ribs 55, i.e. the variations in diameter of the outer surface of the wheel 5 in the direction of the second axis YY.

In use, for example in a field, in the working position, the tyres 51 create furrows 11 in the ground 10, which are substantially parallel to one another and equidistant, in which seeds may be sown, for example. The spacing between the centres of the furrows 11 corresponds to the pitch between the adjacent ribs 55, in other words belonging to two adjacent pattern elements 54. This spacing corresponds to the pitch $L_{P5}$ of the wheel 5. The choice of value for the pitch $L_{P5}$ depends on the desired spacing between the furrows 11. The width of the furrows 11 produced by the tyre 51 may be chosen as a function of the intended applications, to enable, for example, a single line of sowings or at least two lines of sowings to be formed.

The depth of the furrows 11 corresponds substantially to the height $L_{H5}$ of the ribs 55. The choice of value for the height $L_{H5}$ of the ribs 55 depends on the desired depth of the furrows 11.

In the embodiments in FIGS. 12 and 13, the ribs 55 of a wheel 5 have a trapezium-shaped profile. Alternatively, the ribs 55 may have a profile in the shape of a rounded dome. However, unlike the rollers 4, the wheels 5 are intended to support the weight of the agricultural machine 1 in the transporting position and at high speed. The tyres 51 are subjected to less wear when there is a large surface area in contact with the road. A trapezium shaped configuration rather than a dome shaped configuration, i.e. with a flattened area 65 provided instead of a dome 47, increases the surface area. The trapezoidal configuration of the ribs 55 of the wheel 5 is therefore preferred, whether the ribs 45 of the roller 4 are of triangular or trapezoidal configuration. The rate of wear of the wheel 5 is reduced.

FIG. 12 shows the geometry of the tread 52 of a wheel 5 in section in a plane containing the second axis YY. FIG. 12 shows a central portion of the tread 52 in the axial direction YY of the wheel 5. Only the variant with a trapezoidal rib profile 55 comprising a flattened area 65 is shown. Each rib 55 has a plane of symmetry perpendicular to the second axis YY and passing through the centre of said rib 55.

The profile of the ribs 55 is partly defined by the shape of the sidewalls 62, 63. Each of the sidewalls 62, 63 has a substantially straight profile in this case. The sidewalls 62, 63 of the same rib 55 form an angle designated a between them. The sidewalls 62, 63 are joined together by the flattened area 65, substantially parallel to the second axis YY.

The moulding 53 is arranged, along the second axis YY, between two similar ribs 55. In the example described here and according to the plane of section of FIG. 12, the moulding 53 is formed by a substantially straight outer surface parallel to the second axis YY. The sidewalls 62, 63 and the mouldings 53 on the one hand and the sidewalls 62, 63 and the flattened areas 65 on the other hand are connected to one another via fillets 69. The fillets 69 are not taken into consideration in the measurement of angles and distances.

The angle (not marked) between the moulding 53 and the sidewall 62, 63 is substantially equal to half the angle α between the two sidewalls 62, 63 of a rib 55, plus 90°. The smaller distance, in the direction of the second axis YY, separating two juxtaposed ribs 55, corresponds to the width of the intermediate moulding 53. The width of the moulding 53 is designated $L_{S5}$. Similarly, the smaller distance, in the direction of the second axis YY, separating two juxtaposed mouldings 53, corresponds to the width of the intermediate rib 55. The width of the rib 55 is designated $L_{L5}$. The pitch $L_{P5}$ of the wheel 5 corresponds to the sum of the width $L_{L5}$ of a rib 55 and the width $L_{S5}$ of a moulding 53. The width of the flattened area 65, in the direction of the second axis YY, is designated $L_{M5}$. The width $L_{M5}$ of the flattened area 65 is less than or equal to the width $L_{L5}$ of the rib 55.

The applicant has established that by respecting the dimensional ratios when producing the tread 52, and hence in the pattern element 54, it was possible to ensure that furrows 11 were produced which conformed to the great majority of the agronomic parameters desired by the users of the agricultural machine 1 while at the same time ensuring satisfactory mechanical behaviour and durability of the tread 52 of the wheels 5. The height $L_{H5}$ of the ribs 55 is between 10% and 70% of the pitch $L_{P5}$ of the wheel 5 and preferably between 15% and 65% of the pitch $L_{P5}$ of the wheel 5. The width $L_{L5}$ of the ribs 55 is between 15% and 40% of the pitch $L_{P5}$ of the wheel 5 and preferably between 20% and 35% of the pitch $L_{P5}$ of the wheel 5. The angle α between the two sidewalls 62, 63 of a rib 55 is greater than or equal to 0 and preferably between 2° and 90°. The width $L_{M5}$ of the flattened area 65 is less than or equal to the width $L_{L4}$ of the rib 45. The angle α between the sidewalls 62, 63 is between 0 and 90°.

FIG. 13 shows an end portion (on the right in FIG. 13) in the direction of the second axis YY of the wheel 5. FIG. 13 is similar to FIG. 12 except that the end half of the end rib 55' is truncated (on the right in FIG. 13). The end rib 55' has an asymmetric profile. In other words, the widths $L'_{L5}$, $L'_{M5}$ and the portion to the right of the angle α' are reduced by comparison with their equivalents in the central ribs 55.

In a similar manner to the spacing between two rollers 4 in FIG. 5 as described above, a spacing is provided between two wheels 5 side by side so as to enable the bearings 20 to be mechanically connected to the frame 3. The truncated appearance of the end ribs 55' makes it possible, in spite of the discontinuity of the treads 52 of the two wheels 5, to preserve the continuity of the pitch $L_{P5}$ between the two wheels 5. The spacing between the ribs 55 of each of the wheels 5 is then preferably equal to a whole number of the pitch $L_{P5}$. The structure of the furrows 11 formed at the interface of the two wheels 5 is then not very different from that of the other furrows 11. This configuration can be transposed to a spacing between a roller 4 and a wheel 5, the pitches $L_{P4}$, $L_{P5}$ of which are identical or only slightly different.

With the exception of the tread 52 and its special configuration, the tyre 51 used is of a known technology. This has the advantage that existing tyres and even second-hand tyres can be used to manufacture the tyres 51. An operation of re-making the tread of such tyres can produce the tyre 51. Such an operation is generally termed retreading. In this way it is possible to reduce the consumption of new material, reduce the manufacturing costs and recycle used tyres.

Conventionally, the use of wheels 5 for travelling on roads and rollers 4 for working in the field has led the companies active in this sector to structure these two components completely differently. This is explained in particular by the very different mechanical constraints in use between rollers 4 and wheels 5. The applicant has gone against this previous practice by giving the covering 42 of the rollers 4, on the one hand, and the tread 52 of the wheel 5, on the other hand, common features. Instead of trying to adapt the rollers 4 for travelling on roads, they have developed a set of wheels and rollers suitable for carrying out the work in the fields in complementary manner.

Reference is now made to FIGS. 14 to 16. The embodiment shown, unlike that in FIGS. 1 to 4, comprises only a left hand lateral roller 4a and a right hand lateral roller 4b. The pitch $L_{P4}$ of repeat of the pattern element 44 of a roller 4 is equal, within 10%, to the repeat pitch $L_{P5}$ of the pattern element 54 of a wheel 5, and preferably within 5%. The height $L_{H4}$ of the ribs 45 of a roller 4 is 90% equal to the height $L_{H5}$ of the ribs 55 of a wheel 5, preferably 50% equal. Such a dimensional match allows good homogeneity of the furrows 11 in the earth 10, whether the furrows are produced by the passage of a roller 4 or a wheel 5.

The shape of the profiles of the ribs 45, 55 of a roller 4 on the one hand and a wheel 5 on the other hand may, moreover, be different, for example a rib 45 of a roller 4 may be substantially triangular and a rib 55 of a wheel 5 may be substantially trapezoidal. The shape of the profiles of the ribs 45, 55 of a roller 4 on the one hand and of a wheel 5 on the other hand are, however, as similar as possible.

By way of example, and to the nearest manufacturing tolerances, the roller 4 has a diameter of between 500 and 1000 mm, for example 810 mm, i.e. a radius $L_{RL}$ of between 250 and 500 mm, for example 405 mm. The heights $L_{H4}$ of ribs 45 are included in the measurement of the radius $L_{RL}$. The roller 4 has a height $L_{H4}$ of the rib 45 of between 10 and 90 mm, preferably between 40 and 70 mm. The roller 4 has a pitch $L_{P4}$ of between 125 and 167 mm, for example 125, 143, 150 or 167 mm. The value of the pitch $L_{P4}$ is selected in particular as a function of the standard values in the field, in order to fit other existing agricultural machinery, for example seed drills. This adaptation to the standard dimensions between the furrows 11 explains the smaller tolerance in the difference in pitch between the roller 4 and the wheel 5 compared with the tolerance in the difference in height between the ribs of the roller 4 and those of the wheel 5. It is possible to have a greater difference in height of the ribs between the roller 4 and the wheel 5. For example, the wheel 5 may have a height $L_{H5}$ of its ribs 55 of about 9 mm, while the roller 4 has a height $L_{H4}$ of its ribs 45 of about 90 mm, or vice versa. This corresponds to a 90% difference. Such a difference has a limited impact on the homogeneity of the furrows 11 produced. The roller 4 has a width $L_{L4}$ of its ribs 45 of between 18 and 67 mm, preferably between 25 and 58 mm.

The wheel 5 has a diameter of between 750 and 1500 mm, for example 1026 mm, i.e. a radius $L_{RE}$ of between 375 and 750 mm, for example 513 mm. The heights $L_{H5}$ of ribs 55 are included in the measurement of the radius $L_{RE}$. The wheel 5 has a height $L_{H5}$ of its rib 55, a pitch $L_{P5}$ and a length $L_{L5}$ of its rib 55, respectively, within the same limits as those of the height $L_{H4}$ of the rib 45, the pitch $L_{P4}$ and the length $L_{L4}$ of the rib 45 of the roller 4.

In the working position shown for example in FIGS. 1, 2, 14 and 15, the first axis XX of a roller 4 and the second axis YY of a wheel 5 are substantially parallel. The first axis XX and the second axis YY are spaced apart by a distance $L_D$ selected to be non-zero. This spacing $L_D$ is due, notably along the vertical component, to the difference between the radii $L_{RN}$, $L_{RE}$, respectively, of the roller 4 and the wheel 5.

Preferably, the distance $L_D$ between the first axis XX and the second axis YY is greater than the height $L_{H4}$ of the ribs 45 of the roller 4 or the height $L_{H5}$ of the ribs 55 of the wheel 5. The distance $L_D$ is less than the greater of the radii $L_{RL}$, $L_{RE}$ of the roller 4 and wheel 5. Preferably, the distance $L_D$ between a first axis XX and a second axis YY is less than the smaller of the radii $L_{RL}$, $L_{RE}$ of the roller 4 and the wheel 5. This selected spacing $L_D$ allows the lower portions of the wheel 5 and the rollers 4 that are in contact with the earth 10 to be substantially aligned while at the same time limiting the bulk of the agricultural machine 1 in the vertical direction and in the front-to-back horizontal direction of the agricultural machine 1. The horizontal misalignment chosen between the rollers 4 and the wheels 5 on the one hand and/or between the rollers 4 on the other hand, as shown in FIGS. 1, 2, and 14 to 16, makes it easier to create to furrows 11 in the earth 10. In the opposite case of a horizontal alignment of the first axes XX and the second axes YY in the direction of advance of the agricultural machine 1, the advancing front of the machine 1 would be substantially rectilinear, which would increase the resistance of the earth 10 to deformation into furrows 11.

In a variant, the agricultural machine 1 is provided with braking means 30 adapted to exert a resistant torque in controlled manner between the second frame 3 and a rim 50. Particularly when using large-diameter wheels 5 of the tractor or truck wheel type, the free space close to the centre of the wheel 5 may advantageously be used for locating braking systems therein, whilst benefiting from ventilation which is favourable to the cooling of the braking means. The existing wheels provided for tractors may also be adapted to receive brakes of this kind without the need for costly adaptations specific to the agricultural machine 1.

In a transporting position shown in FIGS. 3 and 4, the lateral rollers 4 are retracted. The agricultural machine 1 has a maximum dimension in a direction parallel to the second axes YY, which is less than or equal to 3 meters in a transporting position. This makes it possible to comply with the majority of the road standards for transporting the agricultural machine 1 on the public course. It also makes it possible to steer the agricultural machine 1 more easily, for example to perform a half-turn at the end of a field.

The invention is not limited to the embodiments described in detail and to the variants described.

The axes of the wheels and/or rollers are generally parallel to one another but can also be slightly inclined relative to one another, for example in the case of machines fitted with shock absorber systems. This type of system can improve the characteristics of the machine both on the road and in the fields by adapting to the unevenness of the ground being worked.

One support wheel may be sufficient for transporting the agricultural machine when it is pulled along on the road but the configuration comprising at least a pair of wheels greatly improves the stability of the whole by distributing the weight of the machine.

The invention claimed is:

1. An agricultural machine comprising:
a first frame;
at least one roller, the roller including at least one tube mounted for rotation about a first axis on first bearings connected to the first frame;
a second frame connected to the first frame; and
at least one wheel including at least one rim mounted for rotation about a second axis on second bearings connected to the second frame, the wheel including at least one tire threaded onto the rim,
wherein the roller has a covering around the tube, and the tire of the wheel has a tread, the covering and the tread including moldings defining a pattern element repeated in a transverse direction parallel to the first axis, and to the second axis, respectively,
wherein a pitch of transverse repeat of the pattern element of the roller and a pitch of transverse repeat of the pattern element of the wheel are equal to the nearest 10%, and
wherein the respective pattern elements define ribs such that a height of the ribs on the roller and a height of the ribs on the wheel are equal to the nearest 90%,
wherein the repetition and height of the ribs form, in earth, a series of furrows that are substantially parallel and substantially equidistant.

2. The agricultural machine according to claim 1, wherein the covering of the roller is formed by a set of pneumatic tires threaded onto the tube, the tires of the roller being of semi-hollow type, and
wherein a portion of the covering is connected to a sleeve by two sidewalls so as to delimit a hollow annular space.

3. The agricultural machine according to claim 2, wherein a volume of the hollow annular space of one tire of the set of tires is less than a volume of the material that constitutes the one tire.

4. The agricultural machine according to claim 1, wherein a cross-sectional profile of the ribs of at least one of the roller and the wheel has a shape of a rounded dome.

5. The agricultural machine according to claim 1, wherein a cross-sectional profile of the ribs of at least one of the roller and the wheel includes an end having a flattened area.

6. The agricultural machine according to claim 1, wherein the first axis and the second axis are substantially parallel and spaced apart by a selected distance in a working position.

7. The agricultural machine according to claim 6, wherein the selected distance is greater than the height of the ribs of the roller or the wheel and less than a greater of respective radii of the roller and the wheel.

8. The agricultural machine according to claim 7, wherein the selected distance is greater than the height of the ribs of the roller or the wheel and less than a smaller of the radii of the roller and the wheel.

9. The agricultural machine according to claim 1, further comprising braking means configured to exert a resistant torque in a controlled manner between the second frame and the rim.

10. The agricultural machine according to claim 1, wherein the at least one wheel includes two wheels or two pairs of wheels,
wherein the at least one roller includes a central roller and two lateral rollers,
wherein each wheel or pair of wheels is disposed between the central roller and each of the lateral rollers, respectively, in a direction parallel to the first axis, in a working position.

11. The agricultural machine according to claim 10, wherein each of the two lateral rollers is retractable into a transporting position.

12. The agricultural machine according to claim 11, having a maximum dimension in a direction parallel to the first axis of the central roller which is less than or equal to 3 meters in the transporting position.

* * * * *